(12) United States Patent
Winslow

(10) Patent No.: US 7,785,866 B2
(45) Date of Patent: Aug. 31, 2010

(54) COMPOST TEA APPARATUS

(76) Inventor: Nathan Ernest Winslow, 1005 Stamper Siding Rd., Scotland Neck, NC (US) 27874

( * ) Notice: Subject to any disclaimer, the term of this patent is extended or adjusted under 35 U.S.C. 154(b) by 1118 days.

(21) Appl. No.: 11/308,605

(22) Filed: Apr. 11, 2006

(65) Prior Publication Data
US 2007/0234769 A1    Oct. 11, 2007

(51) Int. Cl.
  C12M 1/02    (2006.01)
  C12M 1/10    (2006.01)
  C12M 1/00    (2006.01)
  C12M 1/12    (2006.01)
(52) U.S. Cl. ............... 435/290.2; 435/297.2; 435/290.4
(58) Field of Classification Search ............... 435/290.2
See application file for complete search history.

(56) References Cited

U.S. PATENT DOCUMENTS

| | | | | |
|---|---|---|---|---|
| 3,616,932 A | | 11/1971 | Bancroft ..................... 210/405 |
| 5,169,782 A | | 12/1992 | Murphy et al. |
| 5,207,904 A | * | 5/1993 | Abel .......................... 210/252 |
| 5,335,784 A | * | 8/1994 | Tyler .......................... 209/260 |
| 5,552,044 A | * | 9/1996 | Abel .......................... 210/252 |
| 6,039,470 A | * | 3/2000 | Conwell ..................... 366/137 |
| 6,136,590 A | * | 10/2000 | Kruse ......................... 435/262 |
| 6,227,379 B1 | * | 5/2001 | Nesseth ...................... 210/393 |
| 6,649,405 B2 | | 11/2003 | Alms et al. |
| 6,727,090 B1 | | 4/2004 | Hronek |
| 6,767,381 B2 | | 7/2004 | Huhn |
| 2002/0139725 A1 | * | 10/2002 | Bolton et al. ............... 209/421 |
| 2003/0113908 A1 | | 6/2003 | Hussey, III et al. |
| 2003/0160006 A1 | * | 8/2003 | Lindh ......................... 210/768 |
| 2004/0043480 A1 | * | 3/2004 | Bouldin .................... 435/290.2 |

* cited by examiner

Primary Examiner—Walter D Griffin
Assistant Examiner—Lydia Edwards

(57) ABSTRACT

An apparatus and method of producing compost tea comprising a hopper, a separator having an intake and a discharge, the hopper communicating compost to the intake, a u-shaped screen, an auger rotably mounted thereon for conveying compost through the separator, and a plurality of spray nozzles directing spray onto the auger and compost, whereby water flows from the nozzles onto the compost separating nutrients and microorganisms from the compost producing compost tea, the compost tea passes through the screen into a catch basin, and the auger conveys the compost through the separator toward the discharge.

15 Claims, 3 Drawing Sheets

SEC. BB

SEC. AA

SEC. BB

US 7,785,866 B2

COMPOST TEA APPARATUS

BACKGROUND OF THE INVENTION

1. Field of the Invention

This invention relates to compost tea, and more particularly to an apparatus for producing compost tea.

2. Description of Related Art

Compost tea refers to a nutrient and microbially enriched solution used in home and commercial agriculture and horticulture environments. The solution has a diversity of uses and applications, ranging from encouraging plant growth to fighting plant pathogens. The solution is generally produced by removing beneficial nutrients and microorganisms from existing compost material and mixing them in water. Once produced, one must use the compost tea within a short period of time to ensure that the beneficial microorganisms which require an aerobic environment, survive until application. Application consists of spraying the compost tea onto the foliage or the soil, depending on the intended use and desired results.

The benefits of compost tea include elimination of the use of commercially produced fertilizers and pesticides that have long-term detrimental effects on the environment. Since the beneficial ingredients of compost tea are naturally occurring, they promote the development of beneficial organisms and insects which naturally control pests while promoting plant growth. Commercially produced pesticides tend to kill both the pests and beneficial organisms and insects. This invention provides an improvement over the prior art equipment for producing compost tea in that the apparatus provides true continuous production of compost tea without re-circulation through the device.

U.S. Pat. No. 6,727,090 to Hronek teaches a continuous compost tea production apparatus. However, the device tends to be difficult to load because of hopper location on top of the unit. Additionally, the device does not pre-screen compost to eliminate unwanted materials causing punctures in, and failure of, the screen as these materials get caught between the screen and auger flights. Also, since compost can compact between the screen and all sides of the auger finer compost material must be used to avoid screen damage. Water nozzles positioned on the auger tend to force compost out towards the screen, increasing the chances of clogging and screen failure. The auger angle of inclination also tends to compact compost in the unit leading to clogging and screen failure. These problems increase downtime of the unit and increase maintenance and repair costs.

Accordingly, what is needed is a continuous compost tea production device that reduces maintenance costs and down-time associated with device failure, increases compost tea production, improves ease of operation for users, and provides flexibility in compost tea volume output.

BRIEF SUMMARY OF THE INVENTION

It is therefore an object of the present invention to provide a new and improved device and method to produce compost tea.

Another object of the invention is the transfer of a substantial portion of beneficial microorganisms and nutrients contained in compost into a usable liquid medium.

Another object of the present invention is to provide continuous production of compost tea.

Another object of the present invention is to provide device for producing compost tea that is easily expandable.

A further object of the present invention is to provide a device for producing compost tea that separates unsuitably large materials and debris from the compost before processing.

Yet another object of the present invention is to reduce down-time and maintenance costs associated with a continuous production compost tea device.

Other objects and advantages of the present invention will be set forth in part in the description and in the drawings which follow, and, in part, will be obvious from the description of may be learned by practice of the invention.

To achieve the foregoing objects, and in accordance with the purpose of the invention as broadly described herein, the present invention provides a device that separates unsuitable materials from compost and produces compost tea.

In a second aspect, the invention comprises a slightly inclined separator unit having an auger conveying means and spray nozzles mounted over the auger for introducing water into the separator and separating beneficial microorganisms from compost material and producing compost tea.

In a third aspect, the invention comprises a separator further comprising two processing units, each unit having a low maintenance u-shaped screen through which compost tea may pass.

In a fourth aspect, feed rate of compost into the separator and compost slurry feed rate through the separator are variable and separately controlled for ease of adjustment and accommodating different types of compost.

In another aspect, an apparatus and method for producing compost tea is described. The apparatus for practicing the process broadly comprises a hopper for receiving compost material. The hopper has a sloped top with a vibratory screen mounted thereon. The vibratory screen separates larger debris and compost clumps from the compost directing them away from the apparatus. Suitable compost vibrates through the screen into the hopper. The bottom of the hopper has a conveyor means for communicating the compost to an intake on the lower end of a slightly upwardly inclined separator. The separator comprises two processing units, with each processing unit further comprising an an intake for receiving compost and a discharge for discharging spent compost, an agitation means, a conveying means, and a means for introducing water under pressure to the unit. Compost is placed into the hopper where the vibratory screen separates unsuitable materials from the compost. A conveying means conveys compost to the separator intakes. The separator conveys compost through the separator while a water injection means introduces water to the compost. As the separator agitates the water and compost slurry, beneficial microorganisms become entrained in the water forming compost tea. Compost tea exists the separator into a discharge basin, while spent compost exists a discharge in the separator.

DETAILED DESCRIPTION OF THE PREFERRED EMBODIMENTS

Figure 1:
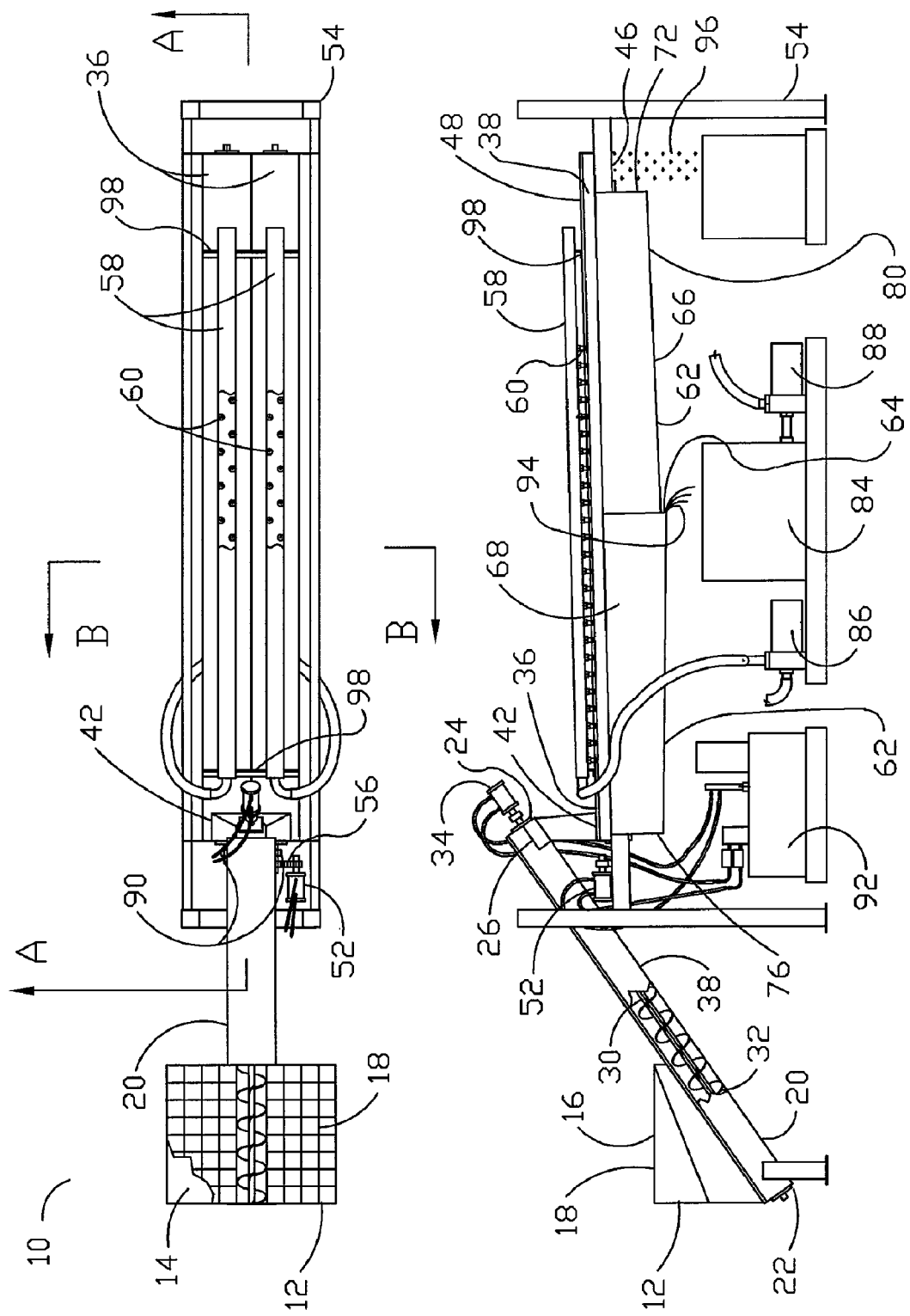
FIG. 1 shows an elevation and plan view of a compost tea apparatus wherein the separator has two processing units.
Figure 2:
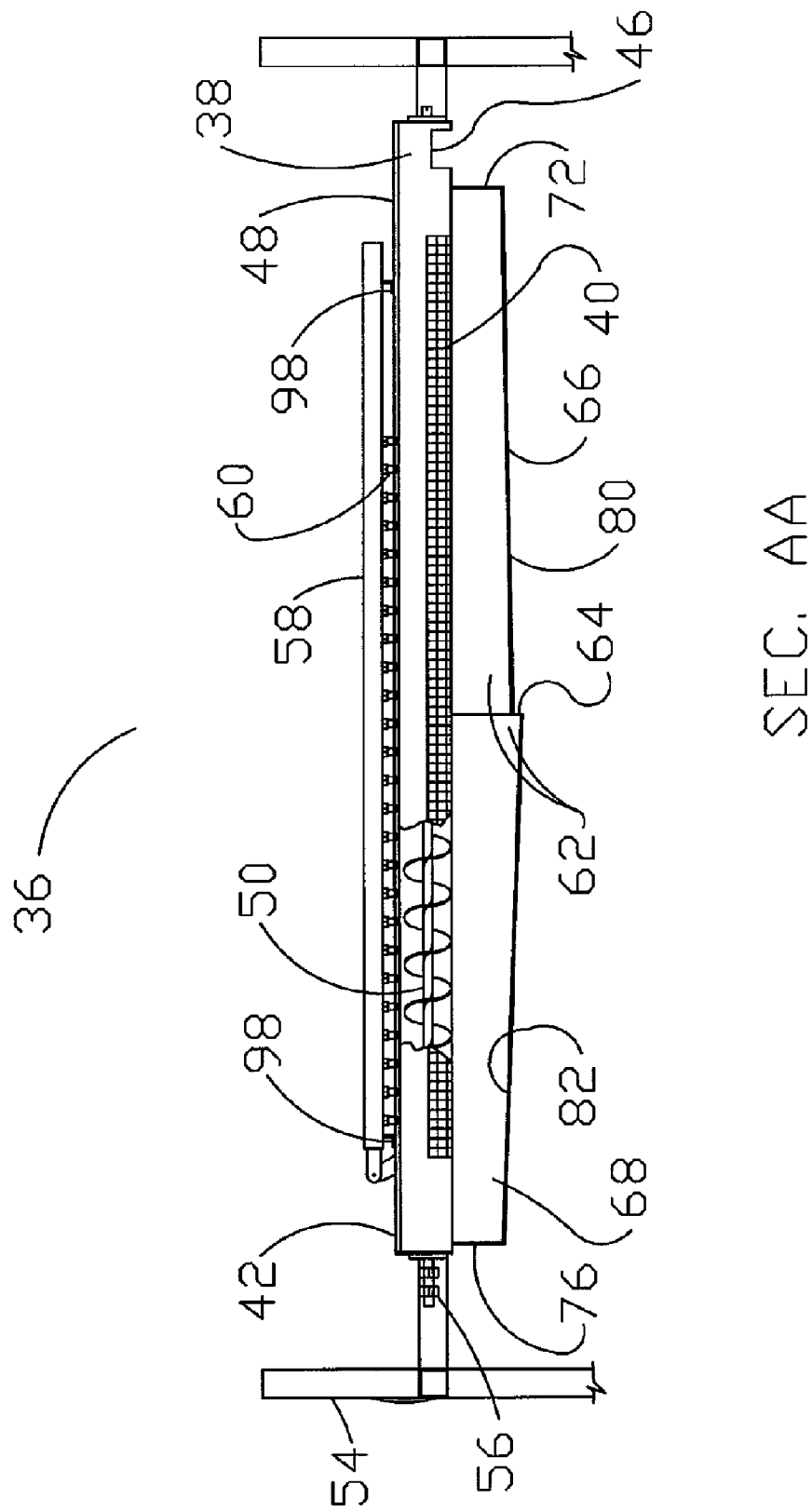
FIG. 2 shows an elevation view of the compost tea apparatus separator.
Figure 3:
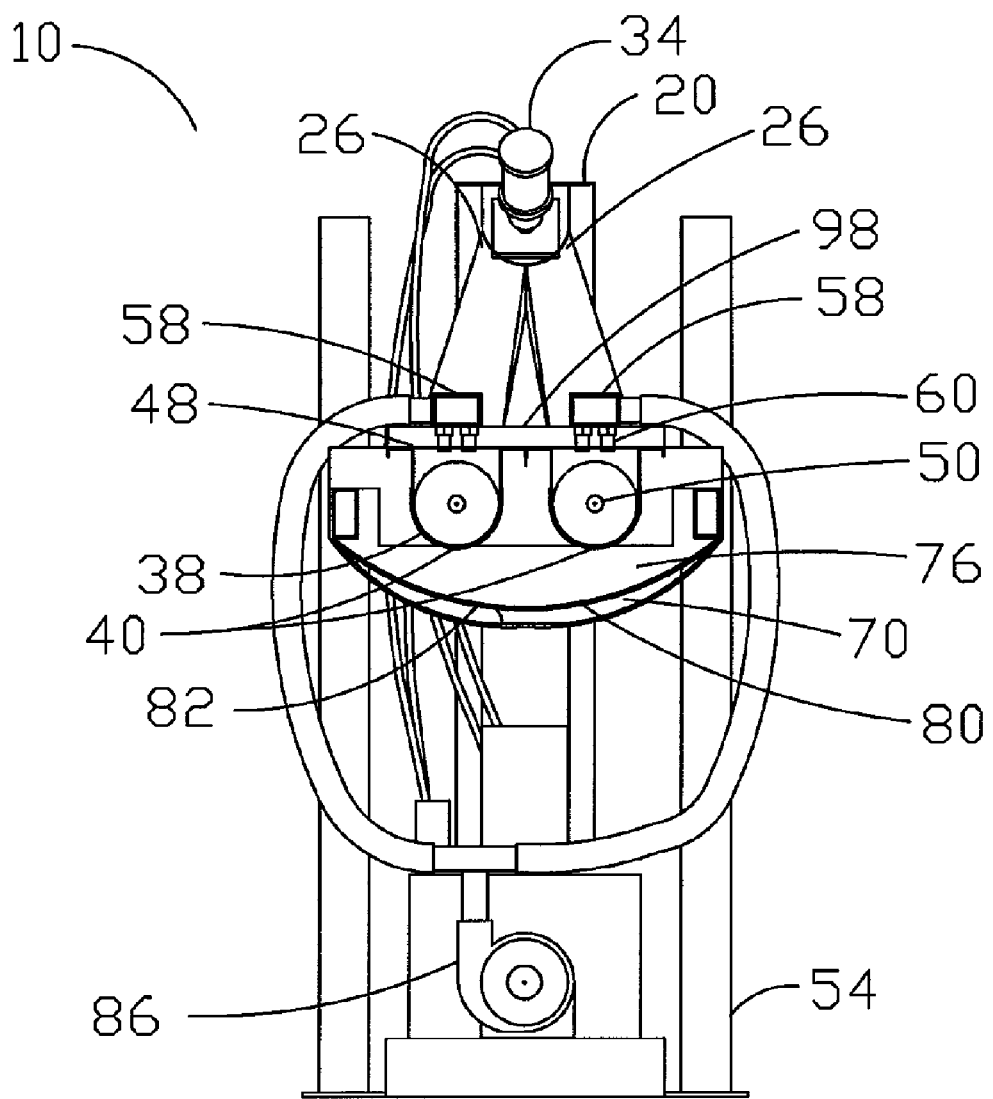
FIG. 3 shows an elevation view of a cross-section of the compost tea apparatus.

Referring more specifically to the drawings, FIG. 1 through FIG. 3, for illustrative purposes the present invention is embodied in the apparatus and method generally depicted therein. It will be appreciated that the apparatus may vary as to configuration and as to details of the parts, and that the method of the invention may vary as to the steps and their sequence, without departing from the basic inventive concepts as disclosed herein.

In accordance with the present invention, a continuous compost tea production apparatus 10 is provided. A compost tea apparatus 10 has a hopper 12 adapted to receive compost. The hopper 12 has a bottom 14 and preferably has a slanted top 16. The bottom 14 preferably rests close to ground level providing users with easy access while placing compost into the hopper 12. A pre-separator 18 mounts on the top 16 for separating unsuitably large clumps of compost or debris from entering the hopper 12 thereby preventing damage to the apparatus 10 and improving operational performance. The pre-separator 18 is preferably a vibratory screen or grate having openings of sufficient size for allowing compost to fall into the hopper 12 while the slant provided by the slanted top 16 directs unsuitable clumps and debris away from both the hopper 12 and the apparatus 10. The vibratory mechanism of the pre-separator 18 facilitates this separation. Additionally, the vibratory mechanism tends to sift the compost before depositing it in the hopper 12. This sifting action reduces clumping and undesirable compost compaction in the hopper 12. The hopper 12 slopes inwardly and downward from the top 16 toward the bottom 14 thus directing compost toward a conveying means 20 having a portion thereof positioned in the bottom 14 of the hopper 12. The conveying means 20 communicates compost from the hopper 12 to a separator. A first end 22 of the conveying means 20 in communication with the hopper bottom 14 receives compost. The conveying means 20 conveys the compost toward a second end 24 having a discharge 26 formed therein. The discharge 26 communicates compost from the conveying means 20 to at least one intake 42 of the separator. A suitable chute or diverter may be used to direct compost from the discharge 26 to the intake 42. In this embodiment, the conveying means 20 comprises an elongated conveyor 28 having a screw-type auger 30 rotably mounted thereon. The auger 30 has helical flights 32 for conveying compost from the hopper bottom 14 to the discharge 26. A suitable motor 34 drives the auger 30. The motor 34 is preferably a variable speed drive so that the rate of compost fed into the separator can be adjusted based on operating parameters such as water flow, compost characteristics, and compost tea 94 discharge rate from the separator, among other factors.

The separator preferably has two identical processing units 36, with each processing unit 36 having an elongated, u-shaped, open bottom trough 38 having a screen 40 securably adapted therein and over the opening, thus lining the trough 38, so that compost tea 94 passes through the screen 40 and out of the bottom of the unit; a suitable conveying means for moving compost through the unit 36; a suitable agitation means; an intake 42 on one end and a discharge 46 on the other end; a removable top 48; and a means for introducing water into the unit 36. The screen 40 should have perforations of sufficient size to allow compost tea 94 to flow freely through while retaining compost inside the separator. In the described embodiment, the conveying means used in each unit 36 is a screw-type auger 50 having helical flights. The unit auger 50 rotably mounts onto the unit 36 inside the screen 40 trough. A suitable drive unit 52, such as a variable speed hydraulic motor, drives the unit auger 50. In this arrangement, the unit auger 50 both conveys compost through the unit 36 and agitates the compost and water introduced therein facilitating introduction of beneficial microbial material from the compost into the water to form compost tea 94. The separator mounts to a frame 54 which provides suitable support for the separator and appurtenant mechanical equipment as further described herein. The frame 54 may also provide support and stability for the conveying means 20 second end 24. Alternatively, the conveying means 20 may be removably attached to the frame 54 providing ease in portability of the apparatus 10. The separator is preferably slightly inclined so that the end having the discharge 46 is slightly elevated over the end having the intake 42. The ends of the separator, as well as each unit 36, are closed with each unit 36 having the unit auger 50 rotably mounted there-through. In a dual-unit separator as described, unit auger 50 drive ends are preferably driven in tandem by a common linkage 56 or chain connected to the drive unit 52. The unit auger 50 conveys compost through the processing unit 36 toward the unit discharge 46. Spent compost 96 exits the unit discharge 46 where it may be collected, removed and discarded.

A manifold 58 or header communicating with a water source provides water for introduction to each unit 36. In the present embodiment, each unit 36 has a manifold 58 having a plurality of spray nozzles 60 mounted thereon. The manifold 58 preferably removably mounts onto the unit 36 so that the spray nozzles 60 direct water over and onto the auger 50 and compost along all or a part of the length of the unit 36. Spray nozzles 60 are preferably aligned in two rows spaced outwardly from the auger 50 axis so that they direct spray on both sides of the auger 50. The two rows of nozzles 60 are also preferably staggered as depicted in the cutaway manifold 58 of FIG. 1's plan view. The separator preferably has a top 48 removably mounted thereon, or alternatively, each unit 36 may have a top 48 removably mounted thereon (described throughout generally as "unit top" 48). The unit top 48 has a series of holes formed, cut or punched there-through for receiving the spray nozzles 60. In a simple embodiment, the manifold 58 may rest unsecured on top of the unit top 48 with the spray nozzles 60 extending down through the series of holes. In this manner, the manifold 58 may be easily removed from the unit top 48 allowing access to the unit 36. The unit top 48 ensures spray and compost slurry remain inside the separator by reducing nozzle 60 over-spray. In the illustrated embodiment, a riser 98 mounts on each end of the unit top 48. The riser 98 supports the manifold 58 which adapts to removably rest on the riser 98. The riser 98 is adapted so that the nozzles 60 are received through the unit top 48 and maintain a suitable clearance above the unit auger 50 flights and compost slurry inside the unit 36.

The illustrated separator further has a primary catch basin 62 mounted under the separator for receiving compost tea 94 passing through the u-shaped screen 40 in each unit 36. The primary catch basin 62 has a discharge 64 formed therein for discharging compost tea 94 from the primary catch basin 62. In the illustrated embodiment, the primary catch basin 62 comprises a first belly pan 66 and a second belly pan 68. The first belly pan 66 has a closed end 72 elevated above an open second end 74. The second belly pan 68 also has a first closed end 76 slightly elevated above an open second end 78. The first belly pan 66 second end 74 is positioned above and overlaps a portion of the second belly pan 68 defining an opening there-between, so that compost tea 94 pouring into the first belly pan 66 flows to the first belly pan 66 second end 74 and cascades into the second belly pan 68. Compost tea 94 received by the second belly pan 68 flows towards the second belly pan 68 open end 76, which is also the catch basin discharge 64 opening formed by the underside 80 of the first belly pan 66 and the trough side 82 of the second belly pan 68. Alternatively, the catch basin 62 could be manufactured to form a single receiver for the compost tea 94 having a discharge port mounted thereon forming the catch basin discharge 64. In the illustrated embodiment, a secondary container 84 receives compost tea 94 flowing from the primary catch basin 62 discharge 64. The secondary container 84 has a suitable means of communicating water from the secondary container 84 to a storage container or application environment. In this embodiment, no re-circulation of compost tea 94 is required to obtain satisfactory levels of beneficial microbial content. Thus, so long as compost, water and power means are supplied the apparatus 10 is capable of continuous production of compost tea 94.

As described, suitable drive units operate both the hopper 12 conveying means 20 and unit 36 conveyor means (unit auger 50). Preferably hydraulic variable speed motors 34, 52 drive each auger 30, 50. The appropriate hydraulic power pack 92 mounts on the frame 54 underneath the separator, preferably along with a pump 86 for delivering water from the source to the manifold 58 and spray nozzles 60. A second pump 88 can be mounted on the frame 54 for delivering compost tea 94 from the unit 36 to the final storage container or application environment. The apparatus 10 is preferably configured so that additional separators on frames 54 as described herein can be adjoined to a primary separator to increase capacity. Alternatively, a larger frame 54 could be utilized that supports multiple separators thereon. The unit augers 50 each have a drive gear 90 mounted to the drive end of the unit auger 50. These drive gears 90 which are linked by a chain or other linkage 56 so that unit augers 50 are driven in tandem. If additional separators are employed, an extended linkage 56 between each unit augers 50 drive gear 90 is provided to run all unit augers 50 in tandem. Larger hopper 12 sizes can also be utilized to hold greater amounts of compost for feeding into multiple separators. If multiple separators are so linked, the diverter communicating compost from the hopper conveyor discharge 26 to the separator intake 42 would be modified to communicate compost to an intake 42 in each separator or processing unit 36 of each separator.

If many separators are linked the hopper 12 should be suitably adapted to receive more compost to adequately feed each separator. In such cases, the hopper 12 conveying means 20 might also be modified to adequately accommodate several units 36. By example, the conveying means 20 might discharge compost into a trough having an auger rotably mounted thereon. The trough would have a series of drops communicating compost to each separator unit's intake 42. The trough auger in this embodiment would convey the compost through the trough providing compost to each separator through the drop communicating with that separator's intake 42. Those skilled in the art of conveyance will appreciate many different methods of conveying compost from the hopper 12 to the separators in such embodiments, the suitable means of which are hereby incorporated by reference.

In operation, the separator discharge 46 end is preferably inclined between just over 0 degrees to 3 degrees from horizontal. This slight incline is preferred over a greater angle of inclination practiced by current teachings since compost is able to move more freely in the processing units 36 without the compaction that a larger inclination angle introduces. Further, a water pressure of approximately 40 psi has been found acceptable in producing quality compost tea 94. In practice, a dual processing unit 36 apparatus 10 of approximately 9 feet in length is capable of producing 100 gallons of compost tea 94 per minute, with each processing unit 36 producing 50 gallons of compost tea 94 per minute. If multiple units 36 are linked as described above, greater capacities can easily be achieved. The use of spray nozzles 60 mounted above the unit auger 50 has been found beneficial. This arrangement allows larger clumps of compost to move through the separator since compost can move upward without the restraints of a completely enclosed auger. Since the compost is not heavily compacted, with the slurry filling approximately the bottom third of the auger 50, larger articles that might otherwise damage the screen 40 can move more freely through the separator while reducing the opportunity for damage or down-time.

Water volume introduced into the separator, as well as compost throughput, should preferably be adjusted so that the compost and water slurry retain a soupy characteristic. This adjustment has been found to keep the compost in a type of liquid suspension during agitation improving performance and results. The higher water volume during processing also allows some particles, such as wood, to move up and away from the screen 40, reducing the opportunity for damage.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

What is claimed is:

1. An apparatus for producing compost tea comprising:
    a hopper adapted to receive compost material;
    a separator having at least one intake and at least one discharge, at least one processing unit comprising an elongated u-shaped screen through which the compost tea exits the at least one separator, the hopper being in communication with the at least one intake of the least one separator;
    a conveying means for conveying compost from the at least one intake, through the at least one separator, and out of the at least one discharge;
    a means for introducing water into the at least one separator and onto the compost conveying through the at least one separator to produce compost tea;
    an agitation means to agitate the water and compost inside the separator.

2. The apparatus of claim 1 wherein the at least one processing unit has closed ends and further comprises a screw-type unit auger having helical flights mounted thereon, the unit auger being axially rotable in the processing unit, wherein the unit auger comprises both the agitation means and conveying means, the flights having radially outward edges in close proximity with the screen, wherein the hopper communicates compost to the unit auger via the at least one intake and the auger conveys compost through the separator toward the at least one discharge.

3. The apparatus of claim 1 wherein the means for introducing water is a manifold communicating with a water source, the manifold having a plurality of spray nozzles mounted thereon for introducing water under pressure into the unit.

4. The apparatus of claim 3 wherein the plurality of spray nozzles comprise at least two rows staggered about the axis of the auger, wherein the spray nozzles direct water spray onto the auger and compost so that the auger mixes the water from the spray nozzles with the compost to form compost tea, and the compost tea flows through the u-shaped screen to a primary catch basin.

5. The apparatus of claim 1 wherein the at least one discharge has an elevation slightly higher than the at least one intake.

6. The apparatus of claim 1 wherein the hopper includes a bottom and a conveying means for communicating compost from the hopper bottom to the at least one intake.

7. The apparatus of claim 6 wherein the apparatus has a pre-separator for separating unusable debris from the compost, the pre-separator further communicating with the hopper and communicating compost into the hopper and directing unusable material away from the hopper.

8. The apparatus of claim 7 wherein the hopper has a slanted top having the pre-separator mounted thereon.

9. The apparatus of claim 7 wherein the pre-separator comprises a vibratory screen.

10. The apparatus of claim 1 wherein the separator further comprises a primary catch basin positioned below the separating means, the primary catch basin having a basin discharge adapted for discharging compost tea from the apparatus, the separating means further comprising a u-shaped screen forming a trough having closed distal ends.

11. An apparatus for producing compost tea comprising:
a hopper having a slanted top and a bottom;
a hopper auger having a first end communicating with the hopper bottom and a second end having a discharge formed therein, the hopper auger for conveying compost from the hopper to the discharge;
a pre-separator comprising a vibratory screen mounted on the top for separating unsuitably large compost materials or debris from entering the hopper while communicating compost to the hopper;
a separator further comprising an at least one u-shaped screen forming a trough having closed ends, and at least one intake in communication with the hopper auger discharge for receiving compost into the separator, and at least one discharge for discharging spent compost from the separator, a catch basin positioned below the at least one u-shaped screen for receiving compost tea flowing through the at least one u-shaped screen, a screw-type auger rotably mounted on the at least one u-shaped screen, the auger having helical flights for conveying compost through the separator from the at least one intake to the at least one discharge, the helical flights having radially outermost edges in close proximity with the at least one u-shaped screen, a plurality of spray nozzles positioned over the auger directing spray downward onto the auger and compost, and a means connecting the water nozzles to a water supply under pressure.

12. The apparatus of claim 11 wherein the water nozzles are positioned in at least 2 rows directing spray onto compost in the separator and on either side of the auger, the nozzles being interconnected by a common fluid supply manifold, wherein the manifold is in communication with the water supply under pressure.

13. A method of producing compost tea comprising the steps of:
providing a separator having an at least one intake and an at least one discharge, an at least one screw-type auger rotably mounted in the separator, and a plurality of spray nozzles communicating with a water source for directing water spray onto the auger;
introducing compost material into the at least one intake;
operating the separator whereby the at least one auger agitates and conveys compost from the at least one intake to the at least one discharge while supplying water to the spray nozzles under pressure so that the nozzles direct water spray onto the auger and compost to form compost tea;
collecting the compost tea.

14. The method of claim 13 wherein compost and water are continuously provided to the separator to produce a continuous compost tea production operation.

15. The method of claim 13 further comprising the step of separating large clumps of compost and unusable materials from the compost before introducing the compost material into the at least one intake.

* * * * *